April 9, 1935.  A. J. FISCHER  1,997,252
SEWAGE SLUDGE TREATMENT
Filed Jan. 2, 1931
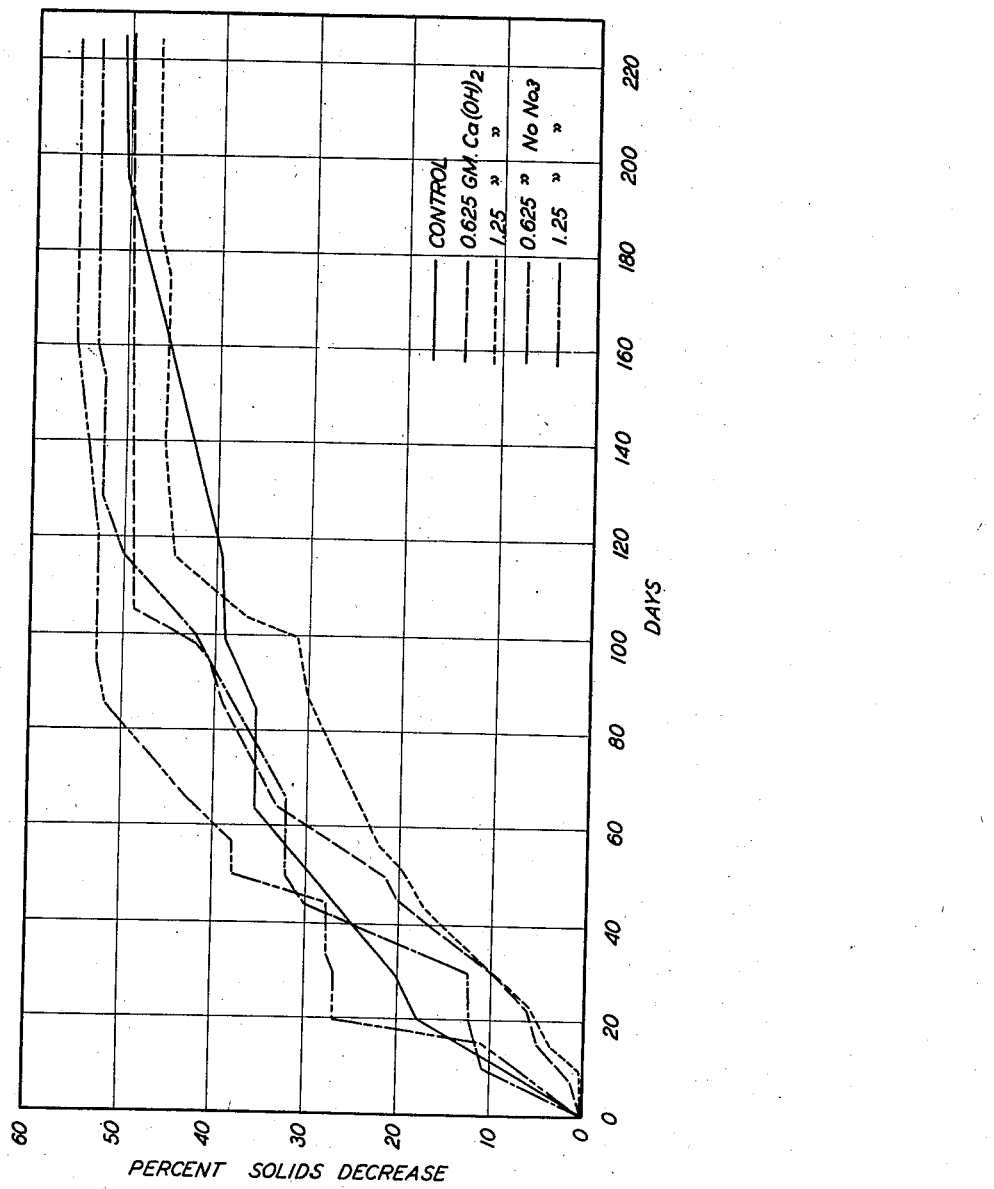
Inventor
ANTHONY J. FISCHER
By Anton Middleton
Attorney Patented Apr. 9, 1935

1,997,252

UNITED STATES PATENT OFFICE 1,997,252

SEWAGE SLUDGE TREATMENT

Anthony J. Fischer, Jackson Heights, N. Y., assignor, by mesne assignments, to The Dorr Company, Inc., New York, N. Y., a corporation of Delaware Application January 2, 1931, Serial No. 506,293

3 Claims. (Cl. 210—2)

This invention relates to a method for treating sewage sludge by the use of which the time required for bacterial digestion thereof is shortened and at the same time is rendered more complete.

In the digestion of sewage sludge by the action of so-called anaerobic bacteria it has been found that the initial period of digestion is marked by liquefaction with a rapid increase in the acidity of the sludge to a pH of 6.4 to 5.0, with concurrent production of gas, particularly carbon dioxide, with perhaps some hydrogen, hydrogen sulfide and nitrogen. This appears to be due to the breaking down of chiefly carbohydrates and simple nitrogen compounds to form organic acids, acid carbonates and gas.

However, the resultant acid condition is very unfavorable to the growth and action of bacterial life so that digestion proceeds very slowly and at a decreasing rate for the first few weeks. During this initial period of digestion a pH of about 6.8 appears to be most favorable to digestion while in the course of this stage of digestion it may actually drop as low as 5.0.

After that time digestion begins to improve very gradually and the pH to rise slowly to 6.8. Gas production is very low at first but as the pH rises comes to predominate over liquefaction. This period of digestion appears to be chiefly one of protein decomposition with the neutralization of acid substances by the products of this decomposition. At first of necessity this stage, which may last for two months or more appears to be one of recovery from the initial acid stage.

The third stage is one of intensive digestion with rapidly increasing alkalinity up to a pH of 7.4 to 7.8, with production of large quantities of methane gas and some carbon dioxide and nitrogen. A pH of about 7.2 appears to be the best for this stage of digestion. This period carries digestion to completion and toward the end the action is naturally slowed down.

It has been found that the addition of limited quantities of lime to sewage sludge prior to or during digestion will result in a marked decrease in the time required for digestion, due doubtless to its action in neutralizing the acids formed in the first stage of digestion.

In a series of original experiments I have found that not only can the time of digestion be shortened but also that the actual digestion or breaking down of the sludge is more complete if I add to the sludge small amounts of certain types of chemicals either alone or in combination with other chemicals.

In the attached graph, which will help in the understanding of my invention, I have plotted calculations from experimental results as percent solids decrease against days using different amounts of lime and sodium nitrate to illustrate this point.

It will be seen from the graph that percent solids decrease in the control does not reach its high level for about 190 days while the curve showing .625 gm. lime reaches approximately the same maximum in about 105 days, and the one using 1.25 gm., i. e. the larger amount of lime reaches a lower maximum in about 115 days.

Comparing these with the curves for sodium nitrate, it will be seen that the .625 gm. $NaNO_3$ sample, while taking slightly longer than the lime to reach its high level, attains more complete digestion as shown by increased solids removal. With 1.25 grams of sodium nitrate the same high level is reached in about 82 days and after 160 days rises to a maximum well above either of the limed samples or the control, i. e. digestion or solids removal was more complete.

The specific substance used in these tests was sodium nitrate but other equivalent substances or mixtures of substances might be used without departing from the spirit of this invention.

When lime alone is added to the sludge undergoing or about to undergo digestion, the quantities of lime used must be limited as the presence of an excess slows up the digestive process as shown by the graph, an alkalinity of above 8.2–8.8 hindering bacterial growth. Also lime alone, when used in proper amounts will speed up but not render more complete the digestive action.

The fact that the quantities of sodium nitrate which I can use do not appear to be so limited, I attribute to the fact that the nitrate radical speeds up the formation of $CO_2$ and organic acids because of its oxidizing properties, and the soda radical thus released is immediately combined in neutralizing these acids so that the digesting sludge is kept at a favorable pH.

The chemicals may be introduced into the digestion receptacle and there mixed as by moderate stirring or by recirculating the contents of the digester or it may preferably be added to the pump used to transfer the sludge to the digester, the object being to thoroly mix the chemicals with the sludge so that no portion of it may become acid.

I attribute the fact that sodium nitrate gives more complete digestion to the fact that by eliminating the definitely acid stage, the initiallyacting bacteria which require a certain amount of oxygen are permitted to break up all available carbohydrate or other material, and are not killed off by an acid condition before completing their action.

Although reference has been made to the use of sodium nitrate, other equivalent substances or mixtures of substances might be used within the scope of this invention.

It is clear from the foregoing description that neither an acid nor a highly alkaline condition is favorable to digestion so that obviously neither sodium hydroxide nor nitric acid could be used to advantage separately even though highly diluted.

Lime in appreciably large quantities has been shown to be not entirely desirable because of its alkaline reaction but when combined as calcium nitrate or used in small quantities with chemicals of the type indicated by this invention, will aid digestion. Ammonium nitrate, potassium nitrate and other alkali or alkaline earth nitrates would fall within the scope of the invention as would also mixtures of either of these with other reagents.

Sulfates, although effective oxidizing agents, are not desirable as they tend to retard digestion and form noxious gases.

Compounds of other oxidizing acid radicals are limited only by practical considerations and any toxic effect which they might have on bacterial life due to special properties.

Such special properties might depend on the composition of the sewage itself especially if contaminated with industrial wastes. For instance, in the treatment of sewage containing large quantities of creamery wastes it is found that sodium nitrate retards digestion. This appears to be due to the fact that the creamery waste promptly decomposes into lactic etc. acids and that the products of nitrate etc. oxidation of these acids are harmful to bacterial life.

I claim:

1. The method of obtaining more complete digestion of sewage sludge which consists in selectively stimulating in the sludge while in liquid condition anaerobic bacteria contained therein by adding a chemical to the sludge which decomposes with concomitant oxidizing and neutralizing effect on the digesting sludge.

2. The method of obtaining more complete digestion of sewage sludge which consists in exposing the sludge to the action of anaerobic bacteria, and in adding an alkali nitrate to the sludge.

3. The method of obtaining more complete digestion of sewage sludge which consists in exposing the sludge to the action of anaerobic bacteria, and in adding sodium nitrate to the sludge.

ANTHONY J. FISCHER.